No. 740,640. PATENTED OCT. 6, 1903.
H. K. GILBERT.
GASKET FOR WATER GAGES.
APPLICATION FILED MAR. 24, 1903.
NO MODEL.

Witnesses
Wm. J. Jacobi
E. M. Brandt

Inventor
Henry K. Gilbert

By
E. S. Bond
Attorney

No. 740,640.

Patented October 6, 1903.

UNITED STATES PATENT OFFICE.

HENRY K. GILBERT, OF NIAGARA FALLS, NEW YORK, ASSIGNOR OF ONE-THIRD TO FRANKLIN J. ROBINSON, OF HYATTSVILLE, MARYLAND.

GASKET FOR WATER-GAGES.

SPECIFICATION forming part of Letters Patent No. 740,640, dated October 6, 1903.

Application filed March 24, 1903. Serial No. 149,325. (No model.)

*To all whom it may concern:*

Be it known that I, HENRY K. GILBERT, a citizen of the United States of America, and a resident of Niagara Falls, in the county of Niagara and State of New York, have invented certain new and useful Improvements in Gaskets for Water-Gages, of which the following is a specification.

This invention relates to certain new and useful improvements in gaskets for sight-glasses, water-gages, &c.; and it has for its object, among others, to provide an improved gasket capable of expansion with greater ease and which shall be less liable to break the glass while being expanded or compressed. I have found from repeated use and experiments with the rubber gaskets now in use that the portion thereof which forms the packing being substantially rectilinear does not compress so readily as is desirable in order to form a steam and water tight joint. Furthermore, in large gaskets the resistance offered by the large amount of rubber in this packing portion of the gasket tends to break the glass upon which it is used. I overcome these objections by making the packing portion of my gasket bulbous or globular, having found from experience that this form yields more readily to compression, makes a better and tighter joint, and avoids all danger of breakage of the glass caused by expansion of the gasket and the glass. Furthermore, the new form of gasket can be more easily adjusted from the glass into the box without cutting or difficulty. In addition to the above advantages the gasket does not contact with the walls of the packing-nut except at the outer edge of the bulbous portion, thus leaving greater room for expansion and in this way lessening the danger of breakage of the glass. My new form of gasket is much easier to compress, and the joint is formed more perfect, and there is less wear on the gasket, thus increasing its durability and usefulness.

Other objects and advantages of the invention will hereinafter appear, and the novel features thereof will be specifically defined by the appended claims.

The invention is clearly illustrated in the accompanying drawings, which, with the numerals of reference marked thereon, form a part of this specification, in which—

Figure 1:
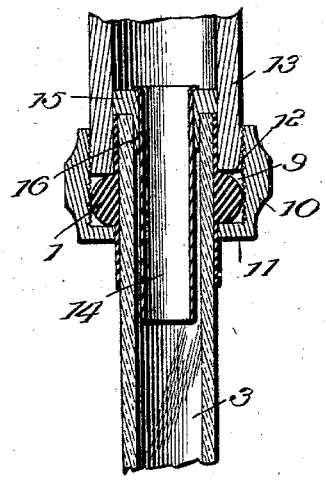
Figure 2:
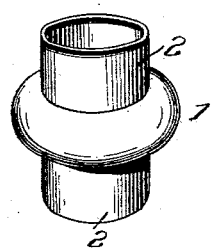
Figure 3:
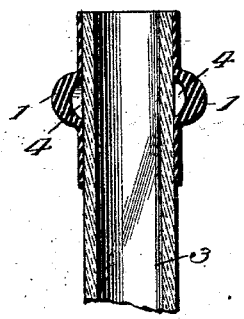
Figure 4:
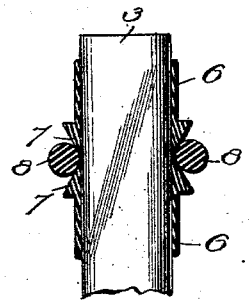

Figure 1 is a longitudinal section substantially central through a portion of a sight-glass, showing my invention applied. Fig. 2 is a perspective view of the gasket removed. Fig. 3 is a longitudinal section showing the gasket of a slightly-different form from that seen in Fig. 1. Fig. 4 shows in elevation a portion of the sight-glass with a different form of gasket applied thereto, the latter being shown in section.

Like numerals of reference indicate like parts throughout the several views.

The invention in its broadest sense involves a gasket of rubber or analogous material having it packing portion of bulb form. This generic idea is capable of embodiment in a variety of forms, the preferable ones of which are herein illustrated.

Referring to the details of the drawings, 1 designates the main or body portion of the gasket, that constituting the packing portion, and this, as seen in the various views, is of bulbous or globular form. It has projecting from either side the tubular portions or flanges 2, which are relatively thin and which are designed to snugly embrace the sight or other glass 3.

The globular portion 1 may be solid, as seen in Fig. 1, or it may be, as shown in Fig. 3, partially hollow upon its inner face, so as to leave the space 4 to give greater elasticity to the portion 1 and permit of its being more easily compressed, so as to expand it within the packing-nut and form a tight joint.

In the form seen in Fig. 4 the body portion 5, from which project the thinner or flange portions 6 to snugly embrace the glass 3, has its outer wall formed upon opposite inclines 7, extending from opposite edges toward the center to form an annular recess or groove, within which is placed the separate ring or body portion 8, the portion of which extending beyond the peripheral edge of the portion 5 constitutes a bulbous or globular packing portion, which I consider the equivalent of the packing portions 1 in Figs. 1, 2, and 3.

It is proposed to make the gaskets of different sizes, so as to adapt them to glasses of different diameters.

The gaskets may be applied to the glass in any of the well-known ways, a gasket being shown in position in Fig. 1 with the globular or bulbous portion held in the chamber 9 within the packing-nut 10, being confined between the flange 11 on such packing-nut and the lower end 12 of the nipple 13, to the lower threaded end of which said packing-nut is adjustably attached. From this view it will be seen how the packing portion of the gasket is readily compressed to form a tight joint, and it will also be observed that the greater portion of this bulbous part 1 is out of contact with the walls of the packing-nut, against which it bears only at the extreme outer periphery, the greatest diameter of said packing portion resulting in the advantages hereinbefore enumerated. In Fig. 1, 14 represents a tube extending within the glass, its upper end being supported upon a gasket 15, the depending portion 16 of which is interposed between said tube 14 and the glass 3 to prevent said tube from coming into contact with the glass.

From the above it will be seen that I have devised a simple, cheap, novel, and efficient form of gasket admirably adapted for the purposes for which it is intended, and while the forms herein described and shown are what I at the present time consider the preferable one it is evident that the same is subject to changes, variations, and modifications without departing from the spirit of the invention or sacrificing any of its advantages, and I therefore do not wish to be restricted to the exact form herein shown and described, but reserve the right to make such changes, variations, and modifications as come properly within the scope of the protection prayed.

In order that the gaskets may be made to serve with the various-sized packing-nuts already in use, I propose to make the gaskets with the bulbous portions of varying diameters and fitnesses, as will be readily understood.

What I claim as new is—

1. As an improved article of manufacture, an elastic gasket having a packing portion and a flange, said portion having an annular groove.

2. As an improved article of manufacture, an elastic gasket having glass-embracing flanges, and a portion intermediate the same, said portion having an annular groove, as and for the purpose set forth.

3. As an improved article of manufacture, an elastic gasket having a flange and a portion at one end of said flange of greater thickness than the material of the flange and said portion having a portion of its substance removed annularly.

4. As an improved article of manufacture, an elastic gasket having a flange and a portion at one end of said flange of greater thickness than the material of the flange, said thickened portion having an annular groove.

Signed by me at Washington, District of Columbia, this 23d day of March, 1903.

HENRY K. GILBERT.

Witnesses:
E. CATESBY ROWZEE,
E. H. BOND.